United States Patent
Huang et al.

(10) Patent No.: US 7,245,360 B2
(45) Date of Patent: Jul. 17, 2007

(54) DETERMINING MFD OF OPTICAL FIBERS

(75) Inventors: Wei-Ping Huang, Spanga (SE); Tomas Adeback, Jarfalla (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 228 days.

(21) Appl. No.: 10/535,976

(22) PCT Filed: Nov. 28, 2003

(86) PCT No.: PCT/SE03/01841

§ 371 (c)(1),
(2), (4) Date: May 24, 2005

(87) PCT Pub. No.: WO2004/051334

PCT Pub. Date: Jun. 17, 2004

(65) Prior Publication Data

US 2006/0051043 A1    Mar. 9, 2006

(30) Foreign Application Priority Data

Dec. 4, 2002    (SE) .................................. 0203599

(51) Int. Cl.
G01N 21/00    (2006.01)
(52) U.S. Cl. .................... 356/73.1; 356/73.1; 385/147
(58) Field of Classification Search .................. 356/73, 356/73.1; 385/96, 147, 140
See application file for complete search history.

(56) References Cited

U.S. PATENT DOCUMENTS

2002/0197027 A1    12/2002    Saito et al.

FOREIGN PATENT DOCUMENTS

| EP | 0890853 A1 | 1/1999 |
| JP | 200275469 A | 10/2000 |
| SE | 502290 C2 | 12/1993 |
| SE | 502374 C2 | 12/1993 |
| WO | WO 0198799 A2 | 12/2001 |
| WO | WO 02082137 A1 | 10/2002 |

OTHER PUBLICATIONS

Patent Abstracts of Japan, vol. 200, No. 13, Feb. 5, 2001.
Swedish Patent Office, International Search Report for PCT/SE2003/001841, dated Mar. 17, 2004.

*Primary Examiner*—Gregory Toatley, Jr.
*Assistant Examiner*—Iyabo S. Alli
(74) *Attorney, Agent, or Firm*—Roger S. Burleigh

(57) ABSTRACT

When an optical fiber (1, 1') is heated by an electrical discharge generated between electrodes (3) thermal light emission from the core and cladding of fiber forms a hot image which can be observed by an optical imaging system (9, 15, 17). Since the concentration of dopants in the core is significantly higher than in the cladding, the light emitted from the core gives a peak structure in the light intensity profile of a hot image. The peak width of the core image increases significantly when dopants diffuse out of the core such as in heating the fiber. The increase of peak width is found to be highly correlated to the expansion of the mode field diameter (MFD) of fiber. This correlation can be experimentally determined at well-defined fusion conditions for any given type of fiber and thereby used to give a measure of the MFD by observing the peak width in hot images. Measures of MFD can be used for improving the quality of estimation of losses in splices of optical fibers.

17 Claims, 8 Drawing Sheets

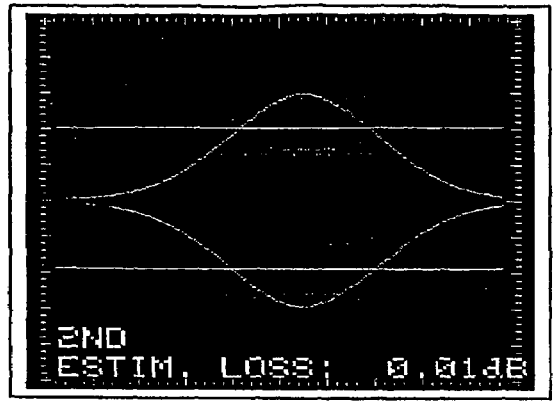
Fig. 3a                    Fig. 3b
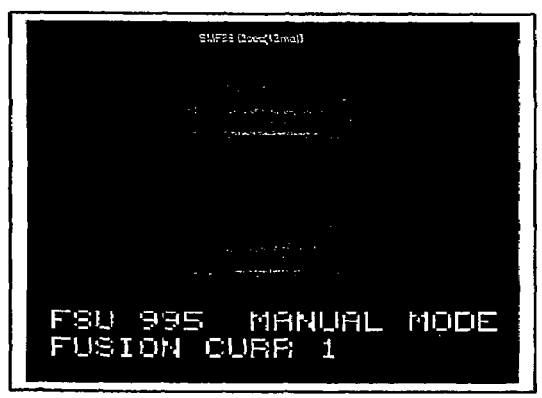
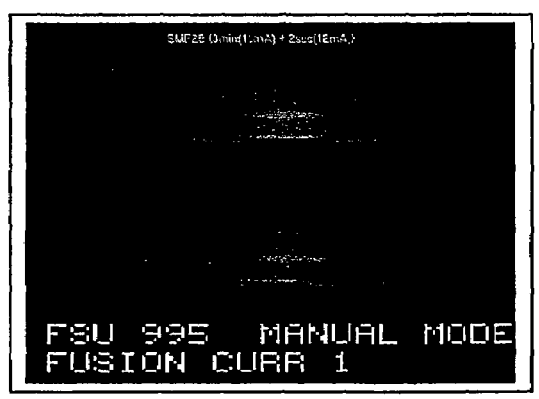
Fig. 4a                    Fig. 4b

DETERMINING MFD OF OPTICAL FIBERS

RELATED APPLICATIONS

This application claims priority and benefit from Swedish patent application No. 0203599-6, filed Dec. 4, 2002, the entire teachings of which are incorporated herein by reference.

TECHNICAL FIELD

The present invention relates to a method of determining the MFD of optical fibers for use in optical fiber fusion splicing devices and to a device for determining the MFD of optical fibers.

BACKGROUND

Equipment and methods for aligning and splicing silica based optical fibers have been developed and improved for many years. It is well known that core/cladding eccentricity, cleave angle, curl, fiber-end contamination and mode field diameter (MFD) mismatch are the main reasons of loss appearing in fusion splices of optical fibers.

Generally, an exact knowledge of the mode field diameter (MFD) of an optical fiber permits determination of various propagation characteristics of light waves guided by an optical fiber, e.g. the coupling efficiency between a light source and an optical fiber, splice losses and chromatic dispersion, etc. The knowledge of the MFD of an optical fiber is usually obtained by the so-called transmitted near field (TNF) method. In this method, light is injected at one end of the fiber and either a magnified image of the other end of the fiber is scanned by a movable detector, or the fiber-end is moved while the detector is stationary. The major disadvantage of the TNF method is that the method is destructive since the fiber has to be cut in order to access the end surface where the MFD is measured. Therefore, the method may not be applicable to handle MFD measurements in dynamic processes, e.g. monitoring variation of MFD during fusion splicing. Furthermore, expensive instrument and highly qualified operators are needed to perform TNF measurements, which are not always available, especially not in the field.

The MFD can generally be considered a function of the diameter of the fiber core, among a lot of other parameters, as appears from e.g. Swedish patents 502374 and 502290. As disclosed in these patents, an image of a heated fiber is captured and analyzed for finding a value of the fiber core diameter. A similar method is disclosed in published Japanese patent application 2000 275469.

SUMMARY

It is an object of the invention to provide a method and a device for measuring the mode field diameter of an optical fiber for use in various splicing processes.

It is another object of the invention to provide a non-intrusive or non-destructive method and device for measuring the mode field diameter of an optical fiber.

Thus generally, a passive method for non-destructively determining the MFD is based on carefully analyzing the light intensity profile of hot images of an optical fiber to extract information on the MFD. The method is supported by experimental results. It can e.g. be used to improve splice-loss estimation for an automated fusion splicer.

When an optical fiber is heated by an electrical arc, or more accurately termed, by a glow discharge, the light thermally emitted from the core and cladding of the fiber can be observed by an optical imaging system that produces a so called hot image. Since the concentration of dopants in the core of the fiber is significantly higher than the concentration in the cladding, the light emitted from the core gives a peak structure in the light intensity profile of a hot image. The width of the core as seen in the core image increases significantly when dopants diffuse out of the core. The increase of the peak width is highly correlated to expansion of the mode field diameter (MFD) of the fiber for a given or considered light wavelength. This correlation can be experimentally determined at well-defined fusion conditions for any given type of fiber. Thereby, by reconstructing the fusion conditions, dynamic changes of the MFD of a fiber for the wavelength during fusion procedures can be determined by analyzing hot images.

Thus, generally, for determining the mode field diameter of an optical fiber, a standard automatic fusion splicer can be used including a support for an optical fiber, a heater for heating a portion of an optical fiber supported by the support and a camera for capturing images of said portion of an optical fiber when supported and heated. An image processing device is connected to the camera for processing images captured by the camera.

The image processing device is arranged to determine the width of the image of a core of the optical fiber in the captured images and therefor comprises a width determining module. This module in turn includes a longitudinal intensity distribution determining unit for determining from the hot image a longitudinal intensity distribution along a region of the image corresponding to the core of the optical fiber. The module further includes a heating center determining unit connected to the longitudinal intensity distribution determining unit for determining from the longitudinal intensity distribution the position of a heating center of the hot image. The heating center is here the center of the heated region where e.g. the heating is most intensive or the temperature highest. The heating center determining unit can e.g. be arranged to determine the position of the heating center as the point where the longitudinal intensity distribution has a maximum value. Furthermore, a transverse intensity determining distribution unit is connected to the heating center determining unit for determining from the hot image a transverse intensity distribution along a line passing through the image of the heating center, this line being substantially perpendicular to the longitudinal direction of the optical fiber. Finally, a width determining unit is connected to the transverse intensity determining distribution unit for determining from the transverse intensity distribution the width of the image of the core in the hot image.

A mode field diameter determining unit is connected to the image processing device for determining from a determined width of a core of an optical fiber the mode field diameter of the heated region of the optical fiber.

Advantageously, the mode field diameter unit can include a curve fitting unit for fitting to the determined transverse intensity distribution a function being a sum of at least two similar, peaked functions, and a curve determining unit or maximum comparing unit connected to the curve fitting unit for taking that one of the at least two similar functions, the sum of which has a best fit, that has the highest maximum value to represent the image of the core of the optical fiber. Then, the width determining unit is arranged to determine the width of the image of the core from said taken one of the at least two similar functions. The function can in a preferred case be a sum of at least two Gaussians and if required a constant. In this case the width can determined as the standard deviation or the half-value width of the taken one of the at least two Gaussians.

In a first alternative, the mode field determining unit can include a data base including a table correlating the width of the core of an optical fiber with the mode field diameter. In second alternative, the mode field determining unit instead can include a calculation unit arranged to calculate, from a value of the width of the core of an optical fiber the mode field diameter of the optical fiber, according to an algorithm individually determined for the type of optical fibers to which the optical fiber belongs.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 3a is a photograph of hot images of an optical SMF28 fiber, the hot images taken in two perpendicular directions placed above each other and a light intensity profile in the longitudinal direction plotted in the photograph, FIG. 3b is a photograph similar to FIG. 3b in which light intensity profiles in transverse directions are plotted, FIG. 4a is a photograph similar to FIG. 3a, FIG. 4b is a photograph similar to FIG. 4a of an optical SMF28 fiber heated for 3 min in an electric glow discharge having a fusion current of 11 mA.

DETAILED DESCRIPTION

It is known that heating an optical fiber can cause dopants such as germanium to diffuse out of the core of the fiber into the cladding thereof, which can in turn enlarge the MFD of the optical fiber. The enlarging rate of the MFD does not only depend on dopant concentration and composition in the core but also on heating temperature, heating time and heating range. Efficient methods for enlargement of MFD include flame techniques using oxygen or hydrogen gas and fusion techniques using an electrical glow discharge or a laser beam.

Figures 9A, 9B:
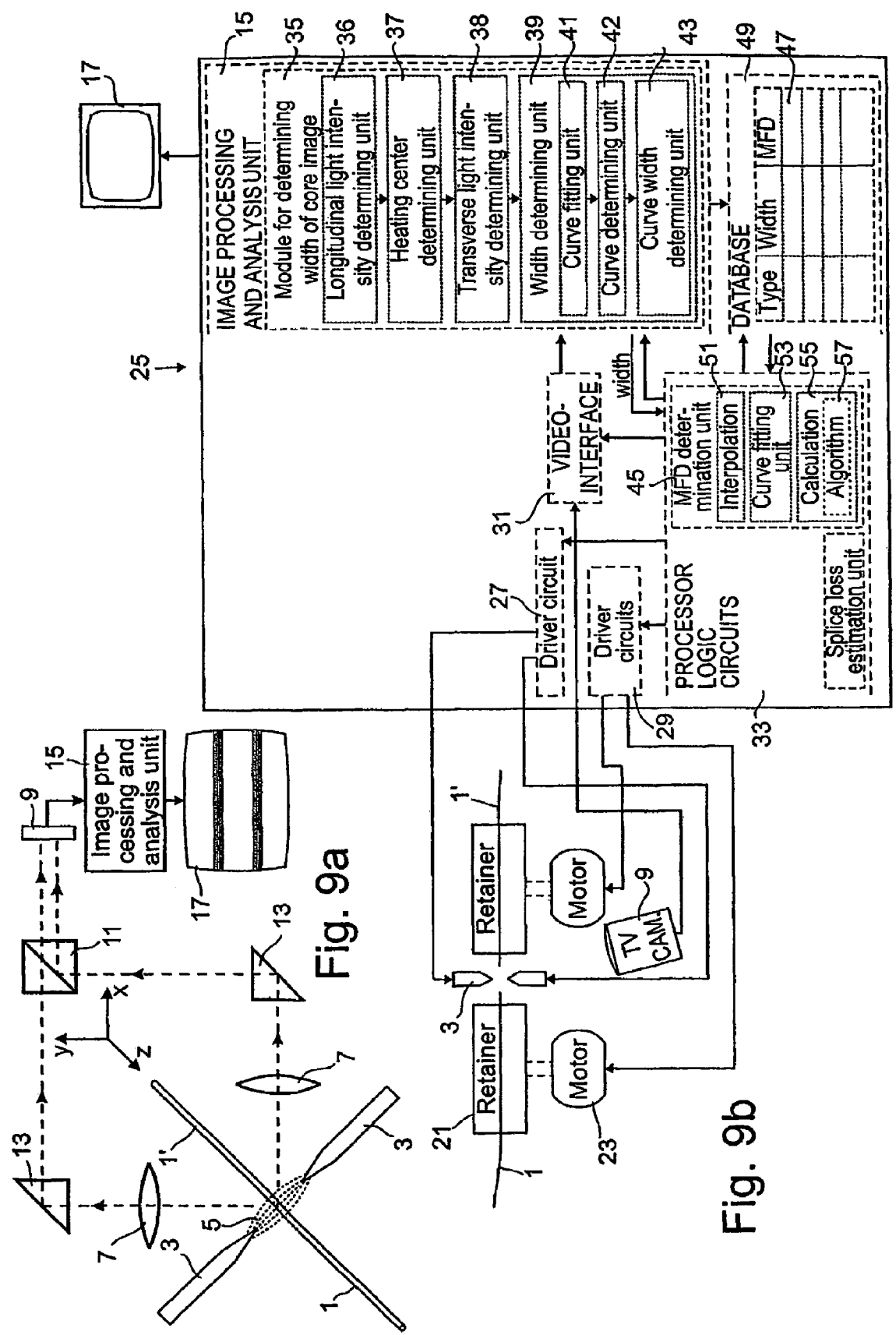
FIG. 9a is a schematic picture of a setup for fusion-splicing two optical fibers to each other that can also be used for heating a single optical fiber.
FIG. 9b is a schematic picture similar to that of FIG. 9b also showing some components of electronic control circuits.

In the method described herein, the optical fiber is heated directly by an electrical glow discharge generated between a pair of electrodes. In particular, in a fusion splicer FSU995 manufactured by Ericsson has been used. In FIG. 9a the basic setup of a typical automatic optical fiber splicer is shown Two optical fibers 1, 1' have their end regions located between points of electrodes 3, between which an electrical discharge 5 is generated for heating the fiber ends, the intensity of the electrical discharge being controlled by the intensity of the electrical current between the electrodes 3. An optical system symbolized by lenses 7 depicts, in two perpendicular directions, the fiber end regions on the light sensitive area 9 of a camera, e.g. a plate carrying CCD elements, the light from the perpendicular directions being deflected by mirrors 11 and combined in a light combining device or beam splitter 13. A digital imaging processing system 15 receives and processes the electric signals from the light sensitive area 9 and thereby monitor the fibers used and the splicing procedure by controlling fiber positioning devices and the intensity of the electrode current. The image processing system is connected to a monitor or display element 17 for e.g. showing the two images. Thus, as indicated in the figure, a displayed picture can show the splicing position between the fiber ends as viewed in the two perpendicular directions, the two views positioned above each other.

In the schematic picture of FIG. 9b some more electrical details of a fiber splicing device of the automatic type are shown. Thus, the splicing device has fixtures or retainers 21, in which the end portions of the fibers 1, 1' are placed and firmly held during the positioning and the splicing. The retainers are movable in three orthogonal coordinate directions both in parallel to the longitudinal direction of the fibers and in two directions perpendicular to this direction. The retainers 21 are thus displaced along suitable mechanical guides, not shown, by control motors 23. Electric lines to the electrodes 3 and the motors 23 extend from an electronic circuit module 25, from driver circuits 27 and 29 respectively. From the TV camera 9 an electric line is arranged to a video interface 31 in the electronic circuit module 25, from which a suitable image signal is delivered to the image processing and image analysis unit 15. The various procedural steps are controlled by a control circuit 33, e.g. a suitable micro processor. The control circuit 33 performs the procedural steps mentioned above and thus controls the displacement of the fiber ends in relation to each other by energizing the motors 23 in suitable displacement directions, provides a signal to the image processing and image analysis unit 15 for starting an analysis of an obtained image. Further, the control circuit 33 controls the time, when a fusion current is to be started to be provided to the electrodes 5 and the time period during which this current is to be delivered and the intensity of the current.

When the optical fibers 1, 1' are heated by the electric glow discharge 5, the thermal radiation emitted from the heated fiber portions and from the air discharge can be observed using the video-camera 9 and analyzed using the digital image processing system 15 of the splicing device. Since the observed light intensity distribution is directly correlated to the emission of light and the largest emission is from the regions which have the highest temperature; i.e. primarily the region of the glow discharge and in particular solid objects within the discharge, information on the location of the glow discharge and its movements can be obtained by observing and carefully analyzing the light intensity distribution.

The fusion splicer of FIGS. 9a and 9b can equally well be used for locally heating a single optical fiber. The optical fiber is then placed in the retainers 21 so that the region of the optical fiber that is to be heated is placed between the retainers and between the points of the electrodes at this position also called the splicing position.

For a single optical fiber, the effective fusion range where hot images can be observed has a length of 300 µm along the fiber axis. The temperature in the fusion area is determined by the fusion current that typically is 6-16 mA, corresponding to a fusion temperature of about 1200-2000° C. The fiber used in experiments performed is a standard single mode fiber (SMF), SMF28™ manufactured by Corning. The tension on the fiber is kept unchanged, i.e. without pulling or pushing the fiber during the fusion processes, pushing meaning that the fiber would be compressed in its axial direction, such as in producing an "overlap" in ordinary fusion splicing. In order to eliminate impact of additional factors, that can affect the MFD measurements, e.g. cladding deformation, geometrical variations of the fiber, e.g. variations of the distance between the center of the core and the cladding, concentricity errors, lack of circular shape, the MFD is measured for different fusion currents, i.e. for different fusion temperatures, and for different fusion times, i.e. for different durations of the heating produced for the fusion process. It is found that for relative long fusion times, e.g. up to 5 min, fusion currents smaller than 11 mA do not cause any significant deformation of the core and the cladding. Therefore, this fusion current of 11 mA has been used in the experiments unless otherwise specified.

Figure 1:
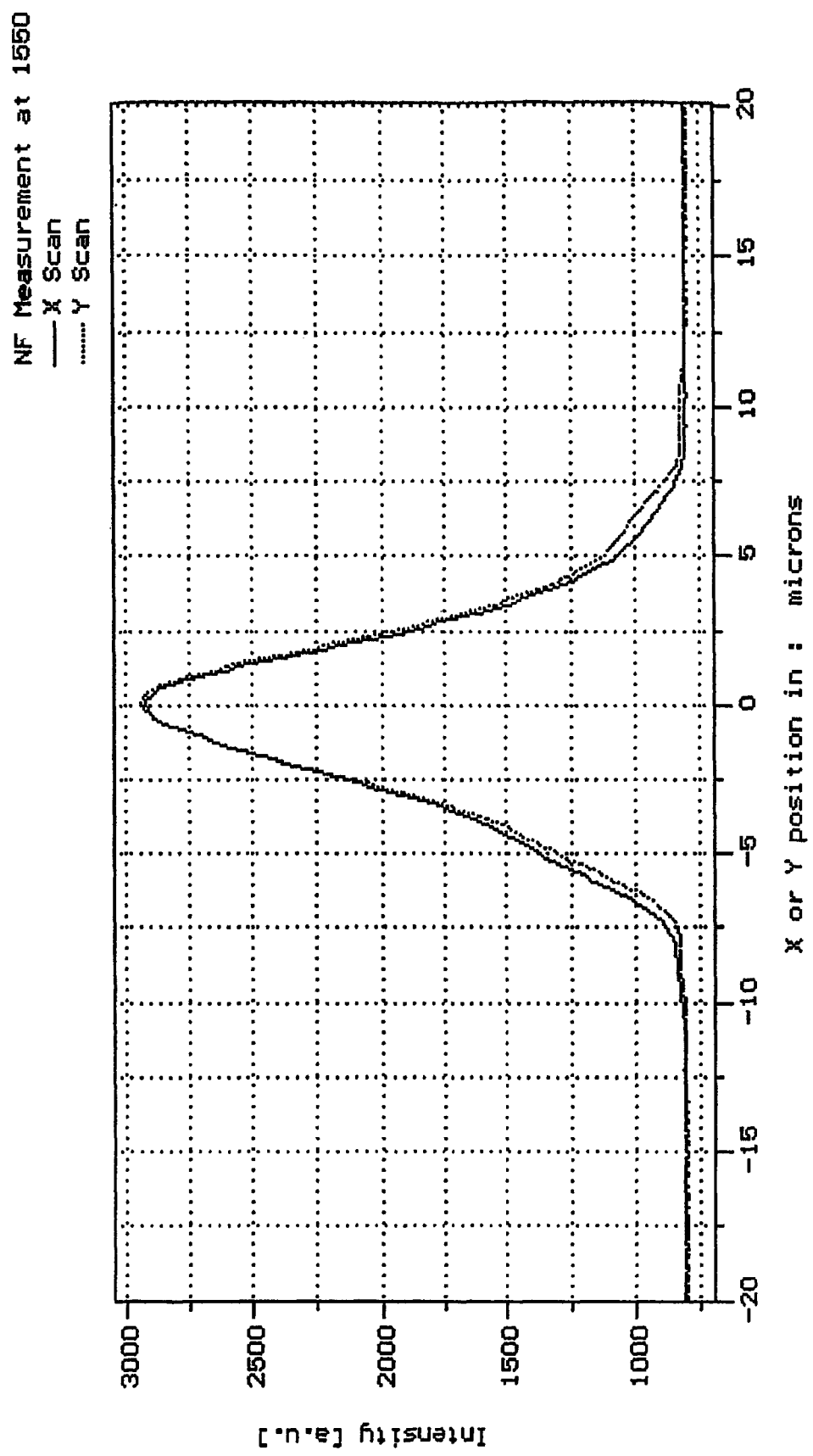
FIG. 1 is a diagram of measured MFD of an optical SMF28 fiber for two perpendicular directions and for a wavelength of 1550 nm.

Under the experimental conditions described above, fusion time dependence of MFD expansion has been studied. The MFD of the fiber to be tested is measured by the TNF method using a refractive index profile and geometry scanner, EXFO NR9200, which involves cutting a locally heated optical fiber at the center of the heated region. The technique for determining the heating center will be discussed hereinafter. FIG. 1 shows a typical example of the intensity variation at a wavelength of 1550 nm for light emitted along a straight line perpendicular to the longitudinal axis of an original SMF28 fiber. Based on Petermann-mode, CCITT G.650, "Definition and test methods for the relevant parameters of single-mode fibers," 1992, and Gauss-mode calculations, the MFD has been calculated, giving values of about 10.97 µm and 9.83 µm, respectively, according to these two methods. For convenience, the Gauss-mode will in the following be used for calculating the MFD.

Figure 2:
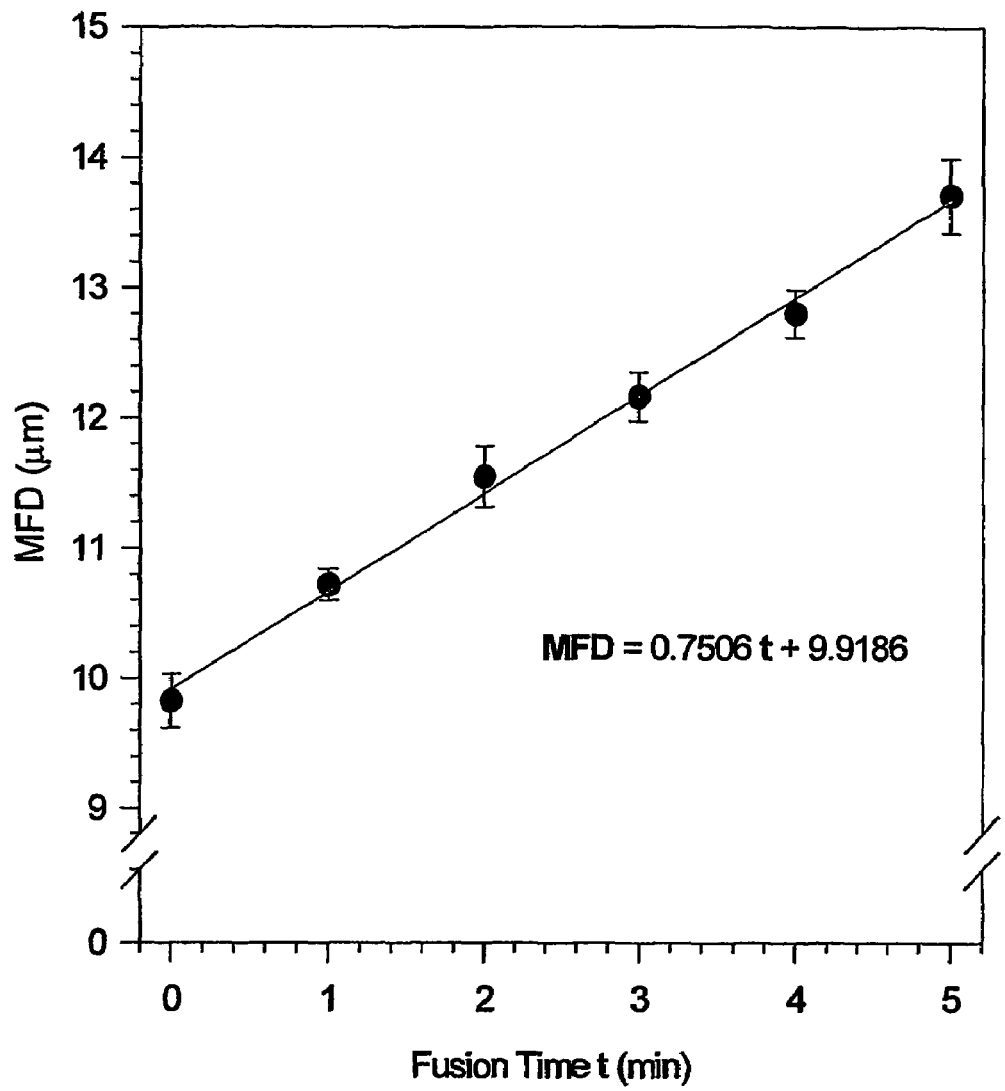
FIG. 2 is a diagram of MFD of an optical SMF28 fiber as a function of heating time duration.

FIG. 2 shows the fusion time dependence of MFD expansion. The measured MFDs are plotted as function of fusion time. Eighteen samples have been measured. The value of each data point is obtained by averaging the data taken from three different samples. The corresponding error bars are also drawn showing the standard deviation of measured data. The measurement errors are mainly due to the lack of accuracy in cutting the fiber and the systematical error of the scanner used.

From FIG. 2 it can be clearly observed that the MFD increases with increasing fusion time. The enlargement of MFD is of about 35% after a heating treatment of 5 min. In order to quantitatively determine the fusion-time dependence of MFD expansion the measured data have been fitted using a first order regression line, see the solid line drawn in FIG. 2. It can be seen that the MFD increases almost linearly with increasing fusion time in this case. The relation can be approximated by:

$$MFD = 0.7506t + 9.9186 \quad t \leq 5 \text{ min} \tag{1}$$

where t is the fusion time in minutes and the MFD is measured in µm. It has to be observed that the MFD expansion may have a completely different behavior if different heating conditions are used. It is reported that a parabolic increase of the MFD with time can be obtained using a propane/oxygen flame micro-burner having a heating range of 5-14 mm, see M. Kihara, S. Tomita, "Loss characteristics of thermally diffused expanded core fiber", IEEE Photon. Technol. Lett., Vol. 4, pp. 1390-1391, 1992.

In order to extract information correlated to MFD expansion, hot images have been taken. Hot images are obtained by detecting thermal light emission of the fiber during the heating process. It is accomplished using an optical imaging system equipped with a CCD-camera and a digital imaging processor. Optimized fusion conditions for taking hot images are found to be an discharge current of 12 mA and fusion times of 2 seconds. These conditions ensure that a number of high quality images can he taken without inducing additional MFD expansion. Therefore, at the end of the heating treatment, an additional fusion process for the optimized fusion conditions is applied for extracting information on the MFD.

FIGS. 3a and 3b show typical hot images taken from two perpendicular observing directions of an original SMF28 fiber. The light intensity distributions of the core image in the transverse and longitudinal directions are also plotted, see the dotted curves in FIGS. 3a and 3b, respectively. The straight, solid lines in FIGS. 3a and 3b show the positions where the distribution profiles of the light intensity in the core images are extracted from the images. The maximum values of the intensity distribution profiles shown in FIG. 3a obviously indicate the position of heating center, which is used to determine the position of the heating center for cutting fibers used in the TNF measurements. In FIG. 3b, the transversal distribution of the core image shows a peak-structure arising around the middle of core. This is because the concentration of dopants in the core is significantly higher than the concentration in the cladding.

It is observed that the width of the peak structure significantly increases with increasing fusion time. FIG. 4a shows hot images taken from the original fiber and FIG. 4b shows the same for the fiber but heated for 3 minutes for a fusion current of 11 mA. It can be clearly seen that the width of the core image, i.e. the bright white zone in the middle of the hot image, becomes much wider after the heat treatment having a duration of 3 min.

In order to get a quantitative insight into the expansion of the core image width with increasing fusion time the profile of light intensity distribution near the core range is extracted from the two views. The profiles are de-convoluted by so-called Chi-Square $\chi^2$ fitting procedures using the Levenberg-Marquardt method, se D. W. Marquardt, Journal of the Society for Industrial and Applied Mathematics, Vol. 11, pp. 431-441, 1963. Here, the light intensity distribution is assumed to be a superposition of Gaussians plus a constant noise background. The quality of the fitting result is evaluated by minimizing a $\chi^2$–merit function:

$$\chi^2 = \sum_{i=1}^{N} \left[\frac{y_i - y(x_l; a_k, b_k, c_k, d)}{\sigma_t}\right]^2 \quad (2)$$

For each measured data point ($x_i$, $y_i$) the corresponding standard deviation is $\sigma_i$, which is estimated by $\sigma_i \approx \sqrt{y_i(x_i)}$, where $y(x_i;a_k,b_k,c_k,d)$ represents a sum of M Gaussians, $a_k$, $b_k$, $c_k$ and d are free fitting parameters and N is the number of data taken for analysis. The fitting function, the sum of M Gaussians and a noise background d, is given by:

$$y(x_l; a_k, b_k, c_k, d) = \sum_{k=1}^{M} a_k \exp\left[-\left(\frac{x_i - b_k}{c_k}\right)^2\right] + d \quad (3)$$

Figure 5:
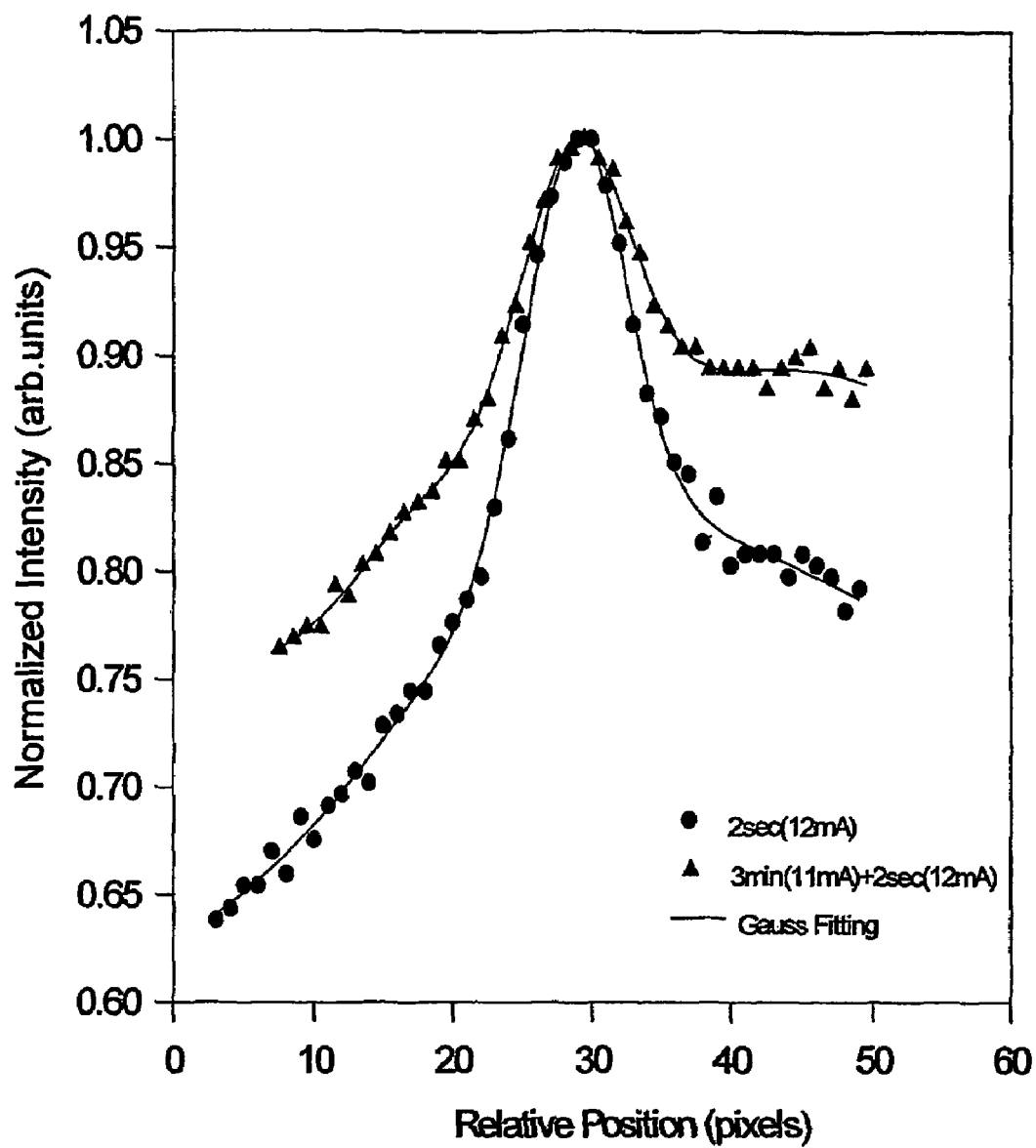
FIG. 5 is a diagram of light intensity distributions in transverse directions derived from the photographs of FIGS. 4a and 4b.

FIG. 5 shows light intensity distributions, taken in a direction perpendicular to the fiber axis and extracted from the photographs of FIGS. 4a and 4b, the distribution of light obtained from FIG. 4a indicated by filled circles and that obtained from FIG. 4b indicated by filled triangles, the light intensity distributions, also called profiles, determined for a range of 50 pixels around the center of the image of the fiber. It is in the graphs of FIG. 5 observed that the light distribution in the image of the very core is superposed on an asymmetric background. The contribution from the asymmetric background is mainly formed by reflected light in the optical system. The phenomenon of reflected light can be observed in FIGS. 4a and 4b, see the white zone close to the bottom edge of the views of the fiber images. This asymmetric contribution gives rise to shoulder structures on the right side of the peaks, see FIG. 5. In order to subtract this contribution, the data are de-convoluted by three Gaussians (M=3) plus a constant noise background. For easier comparison, the data are normalized by the maximum value of the intensity. The fitting results are also plotted, see the graphs indicated by solid curves in FIG. 5. The light profile derived only from the heated core can be taken to be the Gaussian having the largest peak value. The width of the core image can be determined as some width measure of this Gaussian, such as the standard deviation or half-value width. It can be clearly seen in FIG. 5 that the width of the core image significantly increases when the heating period is prolonged. The width of the core image is found to expand from 6.8 pixels to 8.4 pixels, corresponding to an expansion of about 24% after a heating treatment for 3 minutes.

Figure 6:
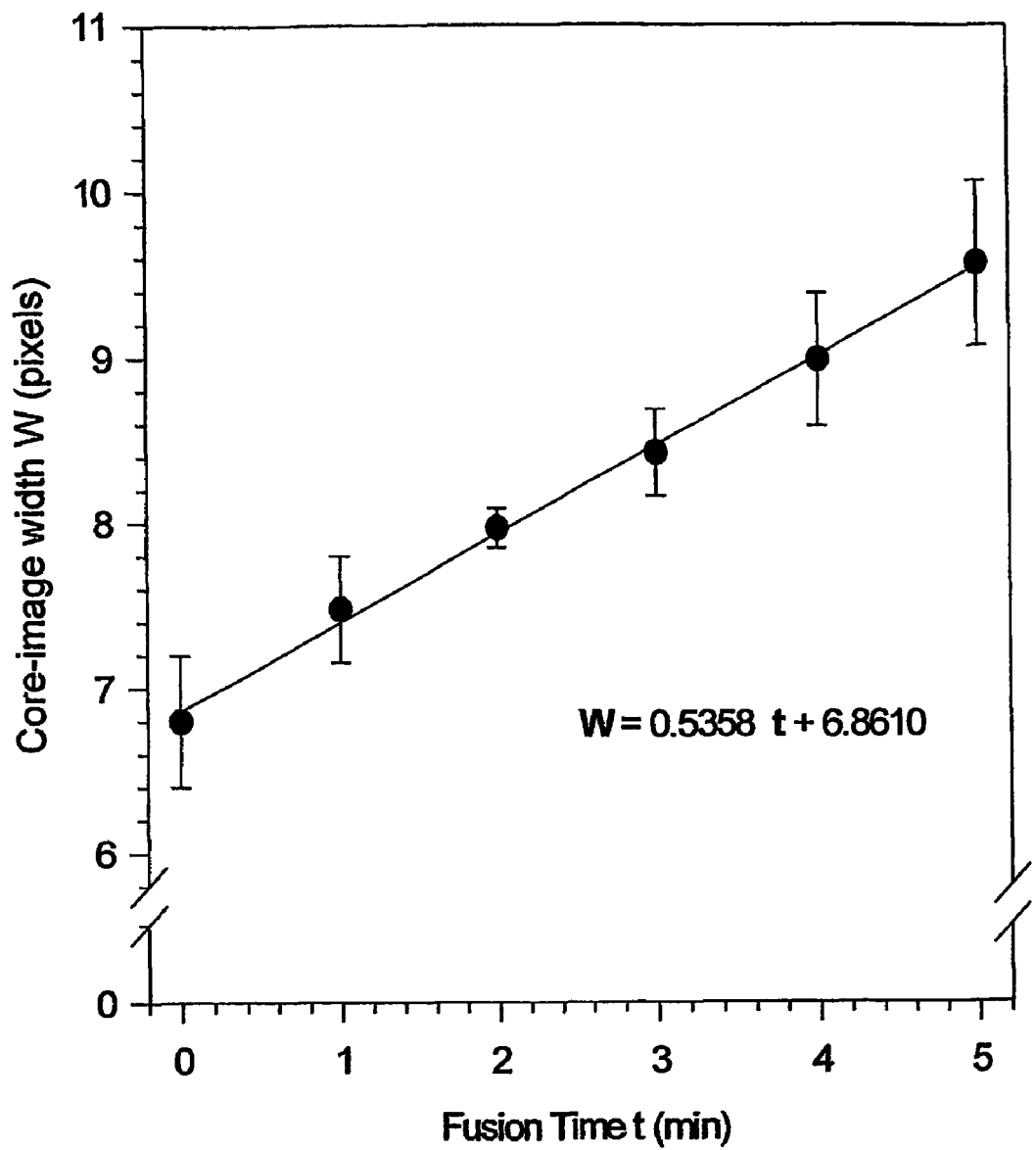
FIG. 6 is a diagram of the core width of an optical SMF28 fiber as a function of heating time duration.

In FIG. 6, the fusion-time dependence of the core image width expansion is plotted. Each data point, indicated by a solid circle, includes six images taken from three samples for two observation directions. The data are fitted using a first order regression line. Again, a linearly increase of the core image width with increasing fusion time is found, which can be given by:

$$W=0.5358t+6.8610 \quad t\leq 5 \text{ min} \quad (4)$$

where t is the time in minutes and W is the width in pixels. The uncertainty of the measurements is given by the standard deviation. The corresponding error bars of the measurements are also drawn. The uncertainty can mainly be attributed to discharge instability because of "arc walk", a phenomenon due to dynamical changes of silica particles deposited on the surface of electrodes. The impact of "arc walk" to the measurements could be minimized by a technique called "arc re-centering", see International patent application No. PCT/SE01/01018, inventors Wei-Ping Huang et al. It is understood that taking a number of hot images for each sample and making use of digital-image processing techniques could also enhance image quality and suppress the uncertainty of measurements.

Figure 7:
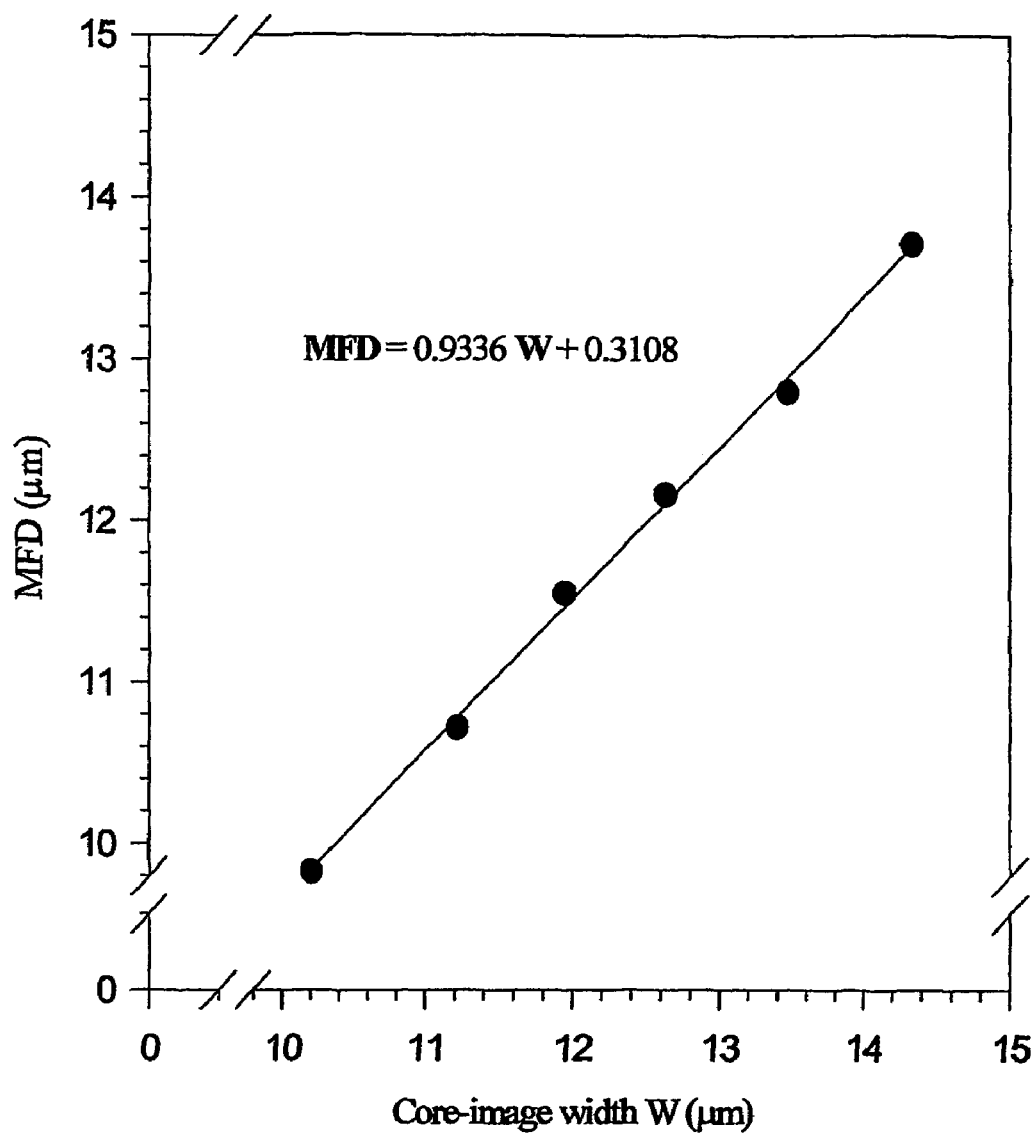
FIG. 7 is a diagram of the MFD of an optical SMF28 fiber as a function of core width.

FIG. 7 shows the relation between the MFD and the core-image width W. The measured data, see the solid circles in FIG. 7, are extracted from the diagrams of FIGS. 2 and 6. For convenience of reading, the unit of pixel is converted to μm. The conversion coefficient for the imaging system is 1.5. In order to clarify the relation, the data are fitted by the first order of regression line, see the solid line in FIG. 7. The relation can be given by:

$$MFD=0.9336W+0.3108 \quad t\leq 5 \text{ min} \quad (5)$$

One can immediately find a strongly linear correlation between the expansion of MFD and the expansion of core-image width. The correlation indicates that the information on the dynamical change of MFD with fusion time can be directly obtained by monitoring the corresponding changes of core-image width in hot images.

For the SMF28 fiber, the correlation as shown in formula (5) is relatively simple. The expansion of the MFD and the expansion of the core-image width are almost in the same order of magnitude. However, for different types of optical fibers the correlation may be completely different, e.g. showing a nonlinear dependence. The optimized fusion conditions for extracting information of MFD may also vary from one type of fiber to another due to different dopant compositions and concentrations in the core of the fiber. Therefore, in order to develop a general method for passively determining the MFD, it is necessary to individually investigate, in the laboratory, the correlation and fusion conditions for all types of optical fibers. Thus, e.g. the correlation and the optimized fusion conditions for the major types of fibers available in the market can be investigated such as standard SMF, depressed cladding fiber (DCF), dispersion shifted fiber (DSF), multimode fiber (MMF) and erbium-doped fiber (EDF) etc. After such investigations, the measured results can be used to construct a database for supporting automated processes of MFD detection.

Figure 8:
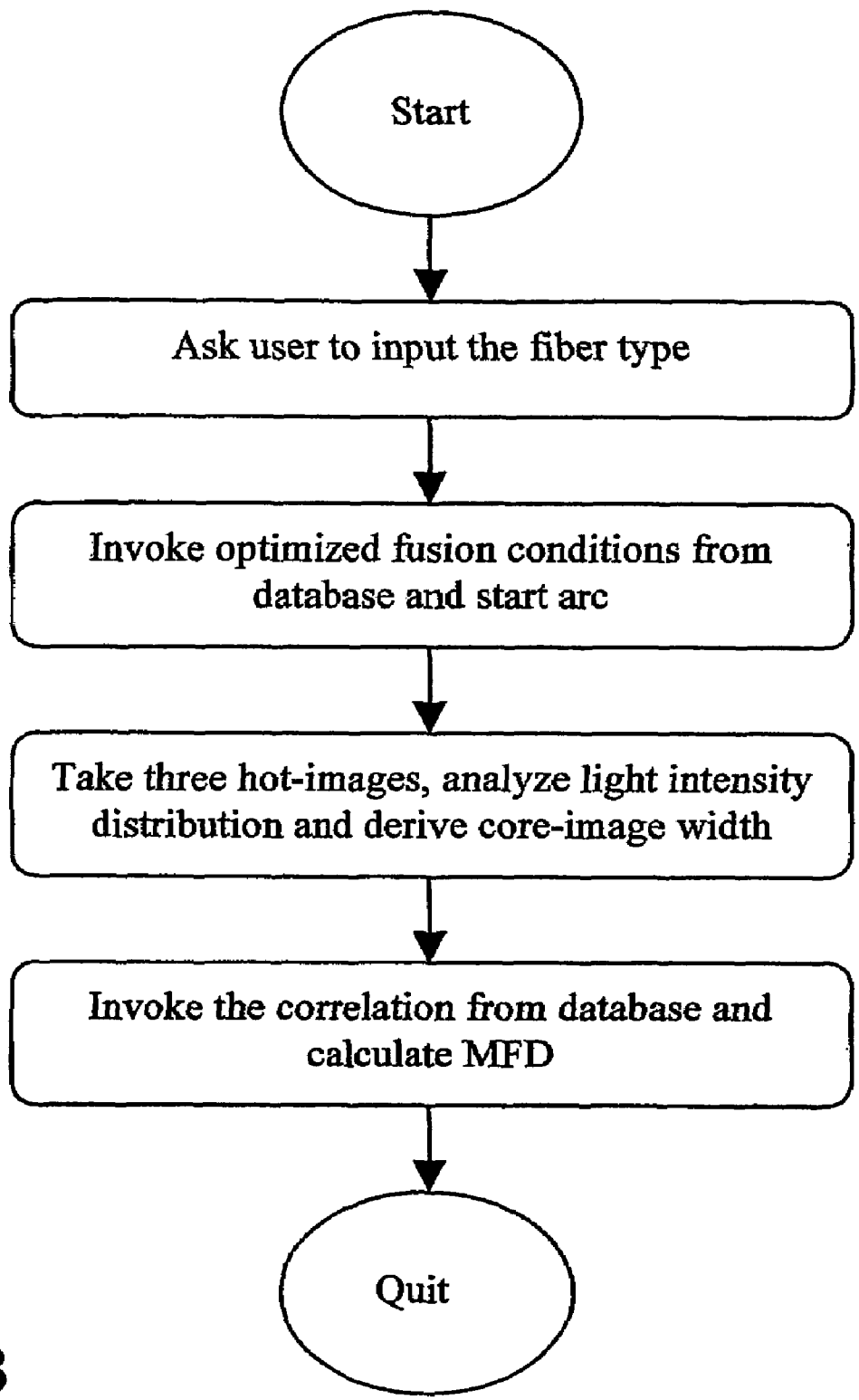
FIG. 8 is a flow chart illustrating general steps performed in determining MFD of an optical fiber.

The steps of the general procedure of passively determining the MFD for an automated fusion splicer as described above are illustrated by the flow chart of FIG. 8. Using the procedure, as controlled by the processor logic circuits 33, see FIG. 9b, in a first step 81 the user is asked to input the type to which the fiber to be heated or observed belongs and the user inputs the type. In a second step optimized fusion parameters are accessed from a database and the electric glow discharge between the electrodes 3 is started. A plurality of hot images, e.g. three images, are taken for the optimized fusion parameters in the fusion processes. The image processing and analyzing unit 15 analyzes the hot images extracting core-image profiles both longitudinally and transversely. The longitudinal intensity distribution of the core image is extracted to determine the heating center at which the transversal intensity distribution is then analyzed to obtain information on the width of the core image. By properly modeling the transversal intensity distribution of the core-image, e.g. using the formulae (2) and (3), the width of the core image is derived. Based on information on the fiber type, the corresponding correlation between MFD and core-image width for the considered fiber is invoked from a database. Therefrom, the MFD is calculated and determined.

The units, which basically are logical blocks executed by one or more suitable processors and are required for the processing, are also seen in FIG. 9b. The image processing and analysis unit 15 thus includes a unit 35 for determining the width of the core image. This determining unit in turn includes a unit 36 for determining longitudinal light intensity profiles, a unit 37 for determining heating centers, a unit 38 for determining transverse light intensity profiles, and a width determining unit 39. The width determining unit includes a unit 41 for curve fitting performing some curve fitting procedure such as the chi-square method outlined above using suitable model functions such as the sums of Gaussians and a constant as described above, a curve determining unit 42 for selecting appropriate curves, in particular that curve included in a composite model curve which is to be used for the determining of the width, and a unit 43 for determining the width from the selected curve included in the fitted model curve. The determined width value is provided to the processor logic circuits 33, to a unit 45 included therein for determining the MFD corresponding to the measured width. The MFD determination unit can use the width value as an input to a table 47 in a database 49 from which a corresponding MFD value is obtained. If the width value cannot be found in the table adjacent values of width together with their corresponding MFDs can be accessed and used by an interpolation unit 51 to calculate the MFD corresponding to the width provided by processing and analyzing unit 15. Alternatively, the table need not be used and instead the MFD determination unit can include a calculation unit 53 calculating the MFD using the width as an input value to an algorithm 55 determined for the type of fiber to which the heated fiber belongs.

One of the direct applications of the method disclosed herein includes improvement of splice loss estimation performed in an automated fusion splicer. A passive method for evaluation of splice losses is used in most automated fusion splicers. Different models for evaluation of splice losses have been explored and developed during the past two decades. The well-known theories for splice-loss estimation are the butt-joint theory, see D. Marcuse, "Loss analysis of single-mode fiber splices", Bell Syst. Tech. J., Vol. 56, pp. 703-718, 1977, and the micro-deformation loss theory and/or the mode coupling theory, see W. Zheng, "Loss estimation for fusion splices of single-mode fibers", in Proc. Int. SPIE'91 Conf., Boston, Mass., Vol. 1580, pp. 380-390, 1991, and W. Zheng, O. Hultén and R. Rylander, "Erbium-doped fiber splicing and splice loss estimation", J. Lightwave Technol., Vol. 12, pp. 430-435, 1994. Thus, the total splice loss $L_T$ can be estimated in terms of different loss mechanisms:

$$L_T = L_{butt\text{-}joint} + L_{core\text{-}misaligment} + L_{core\text{-}deformation} + L_{index\text{-}variation} + L_{macro\text{-}bending} \quad (6)$$

where, $L_{butt\text{-}joint}$, $L_{core\text{-}misaligment}$, $L_{core\text{-}deformation}$, $L_{index\text{-}variation}$ and $L_{macro\text{-}bending}$ are splice losses due to the MFD mismatch, the core misalignment, the core deformation, the index variation and the macro bending of fibers, respectively. They can be given by:

$$L_{butt\text{-}joint} = 20 \log \frac{w_1^2 + w_2^2}{2w_1 w_2} \quad (7)$$

$$L_{core\text{-}misalignment} = F_d\{\lambda, w, a, b, n_1, n_2,\} \frac{d^2}{w^2} \quad (8)$$

-continued $$L_{core\text{-}deformation} = F_\delta\{\gamma, \lambda, w, a, b, n_1, n_2\} \frac{\delta^2}{w^2} \quad (9)$$

$$L_{index\text{-}variation} = F_i\{i(z, I), \lambda, w, a, b, n_1, n_2\} \frac{k^2}{w^2} \quad (10)$$

where $w_1$ and $w_1$ are mode field radii for two fibers being spliced, w (MFD=2w) is the mode field radius of the fiber from which the light signal comes, d is the core offset after fusion, $\delta$ is the core microbending amplitude, $\gamma$ is the microbending decay rate, $k=2\pi/\lambda$ is the wavenumber and $\lambda$ is the wavelength, and $n_1$ and $n_2$ are the refractive indices. The refractive index function i(z,I) is a step function of the z-coordinate along the fiber axis and a discontinuity I. a and b are the radii of the core and cladding, respectively.

$L_{butt\text{-}joint}$ is the intrinsic splice loss between two fibers with different MFDs, $L_{core\text{-}misalignment}$ and $L_{core\text{-}deformation}$ losses are mainly generated by inaccurate alignment of the two fibers, by a bad quality of the fibers, e.g. a high cladding to core eccentricity, a high lack of circular shape of the fibers etc., by bad cleaving angles obtained in the fiber preparation, by a high cladding offset after alignment, and by inappropriate selection of fusion processes and/or fusion parameters. $L_{index\text{-}variation}$ loss represents variation of the refractive index profile due to significant diffusion of the core-dopants during fusion. The macro bending $L_{macro\text{-}bending}$ is mainly caused by imperfect longitudinal alignment of the fibers because of inappropriate force applied on the stripped surface of the fibers, and large size of micro-dusts remaining on the fiber surfaces and/or on V-grooves used for supporting the fibers in process.

Except $L_{macro\text{-}bending}$, most of the loss mechanisms are functions of MFD. Therefore, knowledge of MFD is very important for making accurate loss estimations. Unfortunately, a direct knowledge of MFD can hardly be obtained during fusion processes since the MFD changes dynamically in terms of different fusion processes and fiber combinations. In practice, the final MFD is usually considered as a free parameter used in model calculations, whereas, a suitable value of MFD for the model calculations is manually optimized based on active measurements of splice losses. Due to primarily technical reasons and the rather complicated nature of the involved splicing processes, the optimization of the MFD value for the estimation calculation is a quite difficult and time-consuming job that may only be performed by very experienced operators.

Using the method disclosed herein, the dynamical changes of the MFD during fusion processes can also be observed. Thereby, the variation of MFD can be monitored dynamically. The detected final value of MFD after splicing can be directly used for loss estimation. The tedious and complicated work for manually optimizing the value of MFD can therefore be avoided.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of determining the mode field diameter of an optical fiber, comprising the steps of:
   heating a region of the optical fiber,
   capturing a hot image of the region of the optical fiber,
   determining from the hot image a longitudinal intensity distribution along the region of the image corresponding to the core of the optical fiber,
   determining from the longitudinal intensity distribution a heating center of the hot image, the heating center corresponding to the center of the heated region, wherein the position of the heating center is determined as the point where the longitudinal intensity distribution has a maximum value,
   determining from the hot image a transverse intensity distribution along a line passing through the image of the heating center,
   determining from the transverse intensity distribution the width of the image of the core in the hot image, and
   obtaining from the determined width the mode field diameter of the optical fiber.

2. The method according to claim 1, wherein the step of obtaining the mode field diameter includes the substeps of:
   fitting to the determined transverse intensity distribution a function being a sum of at least two similar, peaked functions,
   taking that one of the at least two similar functions that has the highest maximum value to represent the image of the core of the optical fiber, and
   determining the width of the image of the core from said taken one of the at least two similar functions.

3. The method according to claim 2, wherein in the substep of fitting, the function is taken to be a sum of at least two Gaussians.

4. The method according to claim 3, wherein in the substep of determining the width, the width is determined as the standard deviation or the half-value width.

5. The method according to claim 2, wherein in the substep of fitting, the function is a sum of said at least two similar, peaked functions and a constant.

6. The method according to claim 1, wherein in the step of obtaining the mode field diameter, the mode field diameter is obtained from a data base including a table correlating the width of the core of an optical fiber in a captured image with the mode field diameter.

7. The method according to claim 1, wherein in the step of obtaining the mode field diameter, the mode field diameter is obtained by calculating, from a value of the width of the core of an optical fiber the mode field diameter of the optical fiber, according to an algorithm determined for the type of optical fibers to which the optical fiber belongs.

8. The method according to claim 1, wherein an optical fiber is heated for different time durations or to different temperatures and that for each heating case, a hot image is taken in which the width is determined and the mode field diameter is measured, to produce correlated values of width and mode field diameter, the correlated values used in obtaining the mode field diameter from the width.

9. The method according to claim 8, wherein the mode field diameter is measured using the transmitted near field method.

10. The method according to claim 8, wherein parameters of a model function are determined so that the model function for the determined parameters matches the correlated values and that the model function is used in obtaining the mode field diameter from the width.

11. A device for determining the mode field diameter of an optical fiber, comprising:
    a support for an optical fiber,
    a heater for heating a portion of an optical fiber supported by the support,
    a camera for capturing images of said portion of an optical fiber when supported and heated, and
    an image processing device connected to the camera for processing images captured by the camera, the image processing device comprising a width determining module for determining the width of the image of a core of the optical fiber in the captured images, the width determining module comprising:
    a longitudinal intensity distribution determining unit for determining from the hot image a longitudinal light intensity distribution along a region of the image corresponding to the core of the optical fiber,
    a heating center determining unit connected to the longitudinal intensity distribution determining unit for determining from the longitudinal light intensity distribution the position of a heating center of the hot image, the heating center corresponding to the center of the heated region, wherein the heating center determining unit is arranged to determine the position of the heating center as the point where the longitudinal intensity distribution has a maximum value,
    a transverse intensity determining distribution unit connected to the heating center determining unit for determining from the hot image a transverse light intensity distribution along a line passing through the image of the heating center, and
    a width determining unit connected to the transverse intensity determining distribution unit for determining from the transverse intensity distribution the width of the image of the core in the hot image, and
    a mode field diameter determining unit connected to the image processing device for determining from a determined width of a core of an optical fiber the mode field diameter of the heated region of the optical fiber.

12. The device according to claim 11, wherein the mode field diameter unit includes:
    a curve fitting unit for fitting to the determined transverse intensity distribution a function being a sum of at least two similar, peaked functions, and
    a curve determining unit connected to the curve fitting unit for taking that one of the at least two similar functions, the sum of which has a best fit, that has the highest maximum value to represent the image of the core of the optical fiber, and
    the width determining unit arranged to determine the width of the image of the core from said taken one of the at least two similar functions.

13. The device according to claim 12, wherein the curve fitting unit is arranged to take the function as a sum of at least two Gaussians.

14. The device according to claim 13, wherein the width determining unit is arranged to determine the width as the standard deviation or the half-value width of the taken one of the at least two Gaussians.

15. The device according to claim 12, wherein the curve fitting unit is arranged to take the function as a sum of said at least two similar, peaked functions and a constant.

16. The device according to claim 11, wherein the mode field determining unit comprises a data base including a table correlating the width of the core of an optical fiber with the mode field diameter.

17. The device according to claim 11, wherein the mode field determining unit comprises a calculation unit arranged to calculate, from a value of the width of the core of an optical fiber the mode field diameter of the optical fiber, according to an algorithm determined for the type of optical fibers to which the optical fiber belongs.

* * * * *